United States Patent [19]
Bussmann et al.

[11] Patent Number: 6,000,144
[45] Date of Patent: Dec. 14, 1999

[54] METHOD FOR HEATING AND COOLING FOOD PRODUCTS

[76] Inventors: Paulus Josephus Theodorus Bussmann, Het Schip 239, NL-7325 NM Apeldoorn; Catharina Elizabeth Krist-Spit, Steenhouwersdonk 208, NL-7326 MK Apeldoorn, both of Netherlands

[21] Appl. No.: 08/973,187

[22] PCT Filed: May 31, 1996

[86] PCT No.: PCT/NL96/00215

§ 371 Date: Feb. 5, 1998

§ 102(e) Date: Feb. 5, 1998

[87] PCT Pub. No.: WO96/38048

PCT Pub. Date: Dec. 5, 1996

[30] Foreign Application Priority Data

Jun. 1, 1995 [NL] Netherlands ........................... 1000482

[51] Int. Cl.[6] .................................................. F26B 3/00
[52] U.S. Cl. ............................... 34/332; 34/378; 426/96; 426/466; 426/632
[58] Field of Search .............................. 34/329, 330, 332, 34/343, 370, 378; 426/96, 466, 632; 206/524.6, 524.7; 428/357, 359, 372; 99/323.9, 483

[56] References Cited

U.S. PATENT DOCUMENTS

| | | |
|---|---|---|
| 1,403,211 | 1/1922 | Tribes . |
| 3,898,745 | 8/1975 | Carlsson ..................................... 34/332 |
| 4,193,758 | 3/1980 | Peterson et al. ..................... 426/466 X |
| 4,424,144 | 1/1984 | Pryor . |
| 4,466,987 | 8/1984 | Wilkins et al. .......................... 426/632 |
| 4,578,274 | 3/1986 | Sugisawa et al. ......................... 426/96 |
| 4,578,372 | 3/1986 | Hoving . |
| 4,876,802 | 10/1989 | Gergely et al. ............................ 34/408 |
| 5,431,780 | 7/1995 | Raehse et al. ........................... 510/276 |

FOREIGN PATENT DOCUMENTS

| | | |
|---|---|---|
| 1314172 | 4/1963 | France . |
| 2312197 | 12/1976 | France . |
| 1424984 | 2/1976 | United Kingdom . |
| 1530784 | 11/1978 | United Kingdom . |
| WO 91/08048 | 6/1991 | WIPO . |

OTHER PUBLICATIONS

Z. Alikhani et al. "Absorption Drying of Corn in Zeolite Granules Using a Rotary Drum", XP002010738, Drying Technology, vol. 10, No. 3 p. 783–797 (cited in intl. search report).

Primary Examiner—Henry Bennett
Assistant Examiner—Steve Gravini
Attorney, Agent, or Firm—Handel & Morofsky

[57] ABSTRACT

A method and device for heating and cooling, such as for the sterilization, pasteurization, drying and/or roasting, of food products, such as nuts and beans, for example whole and crushed peanuts and coffee and cocoa beans, comprising bringing the raw food products into contact with a heated granular material, separating of the granular material from the food products after the heat transfer from the heated granular material to the food products, and the subsequent cooling of the food products, the cooling of the food products taking place by means of a granular material which is first conveyed to the product to be cooled and is separated therefrom after the cooling.

21 Claims, 2 Drawing Sheets

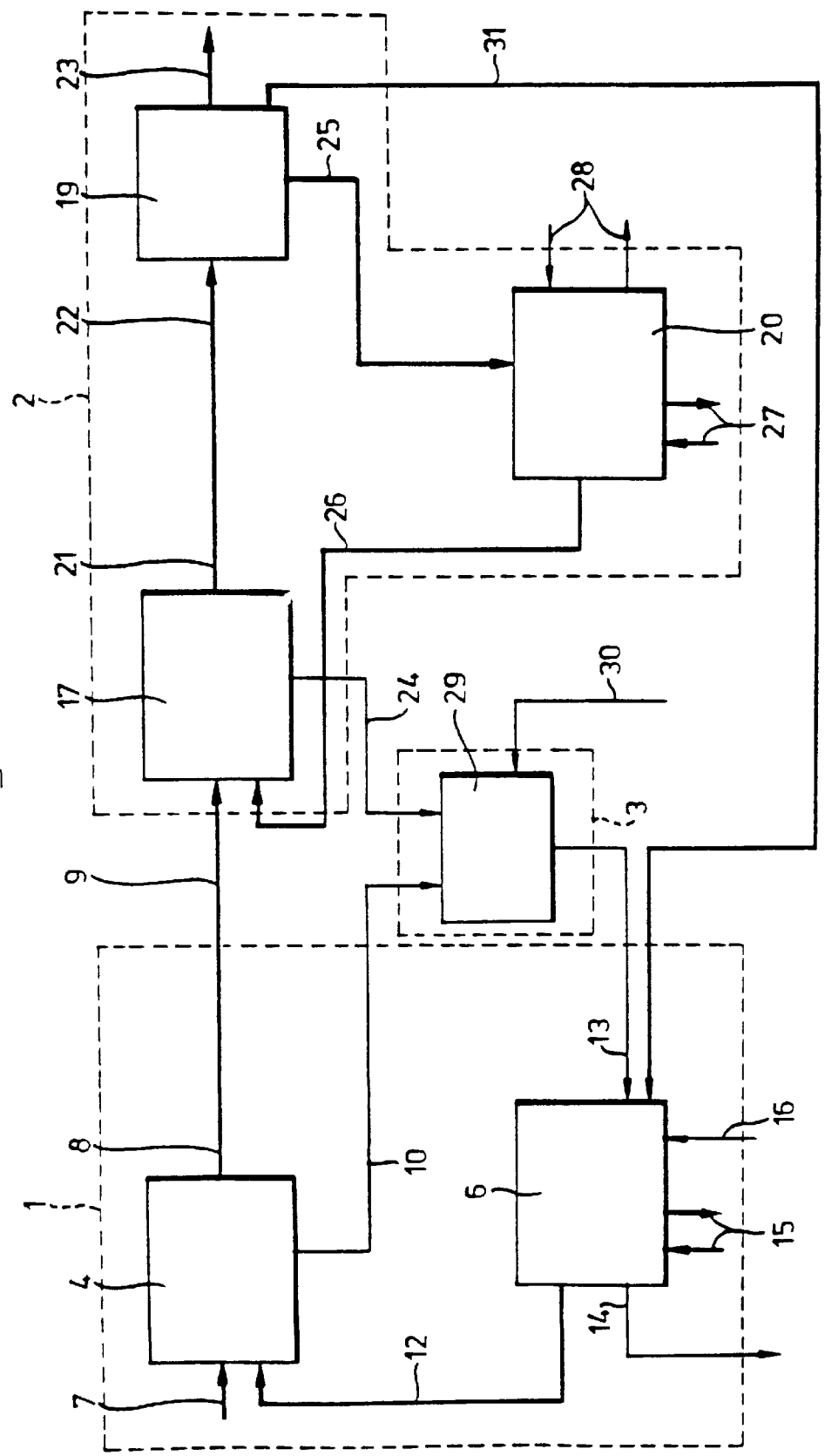

METHOD FOR HEATING AND COOLING FOOD PRODUCTS

The invention relates to a method for heating and cooling, such as for the sterilization, pasteurization, drying and/or roasting, of food products, such as nuts and beans, for example whole and crushed peanuts and coffee and cocoa beans, comprising bringing the raw food products into contact with a heated granular material, separating the granular material from the food products after the heat transfer from the heated granular material to the food products, and the subsequent cooling of the food products.

Such a method is disclosed in British Patent Specification 1,530,784. This discloses the roasting of coffee beans, comprising the bringing of the green beans into contact with a solid, heated material, which is not a fluid, which is inert under operating conditions and which gives up its heat optimally to the green beans, the subsequent separation of the heat-transferring material and the beans, and the final cooling of the roasted coffee beans. Said cooling takes place by spraying the still hot, roasted coffee beans with water and by blowing air over the beans, as a result of which the husks can also be removed. The granular material which has been separated from the coffee beans is reused after each separation and conveyed to a new charge of green coffee beans.

In the roasting process described, gases are released, such as water vapour, hydrocarbons and inorganic compounds, which escape from the system as process emissions. This escape means an inherent energy loss and the release of odours and pollutants into the environment.

In addition, in the process described, the product quality is adversely affected by the supply of water and air for cooling the roasted product. In practice, it is found that such a cooling process cannot be regulated with sufficient accuracy, in particular as regards the regulation of the moisture content of the product at the end of the process. As a result of which a sufficiently homogeneous cooling cannot be achieved and an a least unsatisfactorily reproducible product quality is achieved.

In addition, the cooling of the still hot, roasted product with water and air means inherent energy loss because the heat extracted with the water and the air escape from the system.

In practice, large quantities of air appear to be necessary for cooling according to this known process. All this air has to be taken in, fed through and discharged, which requires suitable installations for the purpose which demand an appreciable quantity of energy for their operation.

A certain amount of water is always present in the system which is used for the known method. This water brings about corrosion of the components in said system.

The object of the invention is to provide a method and a device for heating and cooling food products, such as peanuts and coffee and cocoa beans, which method and device experience the abovementioned disadvantages to a lesser extent.

This object is achieved, according to the present invention, in that the food products are cooled by means of a granular material which is first conveyed to the product to be cooled and is separated therefrom after the cooling. The employment of a granular material makes the cooling process simple to carry out as a closed system, so that energy loss and the escape of gases can be considerably reduced. In addition, no spraying of water has to be used, which avoids an uneven cooling occurring and/or water being absorbed by the product to be cooled or cooled product, which effects generally have a disadvantageous influence on the produce quality. In addition, the occurrence of corrosion is prevented in that no water is supplied and as little condensation as possible occurs. The granular material has properties and a chemical composition which are such that it does not react chemically in the cooling process with the product to be cooled, it easily absorbs heat from the product to be cooled and does not give up any water to the product to be cooled. Preferably, the granular material is a porous material, so that it can contain, for example, water as coolant.

Preferably, the granular material is reused for cooling the food products. Consequently, a closed system is possible, as a result of which process emissions can be treated further—in order to remove undesirable substances or to burn them and prevent the occurrence of undesirable odours—before escaping into the ambient air, and energy loss can be minimized. Some material saving can also be achieved by the reuse of the granular material.

According to the present invention it is not necessary for the roasting process and the cooling process to be strictly separated as regards the flows of granular material. According to the present invention, a granular material can be provided which is eminently suitable for the roasting and the cooling of nuts and beans. The partial separation of the granular material which is used for the roasting of the food products from the then roasted food products is sufficient, it being possible to use the unseparated granular material in the cooling of the roasted food products.

The method according to the present invention results in energy saving in relation to the roasting process and the cooling process compared with the energy consumption of known methods and, in particular, compared with that method which does not include or includes a partial waste-gas treatment. In addition, the invention provides thermal post-incineration of the process emissions. The amount of exhaust gases to be emitted in total is still only 2% to 12% compared with the known methods. The low amounts of granular material compared with the amounts of product results, as regards the equipment, in a more compact design, or a smaller external size, of the roasting process means, depending on the choice of granular material and depending on the free space needed for mixing product and granular material. Less energy will then be absorbed by the means of the system itself, which means a reduction in energy loss. A small thermal post-incinerator is sufficient. Although the method according to the invention does result in more system components than the performance of the known methods, the lines are of much more limited extent.

According to another aspect of the invention, the granular material which has served to cool the roasted food products and has consequently been heated is conveyed to the granular material which has served to roast the raw food products and has consequently been cooled. Consequently, the heat which the granular material has absorbed in the cooling process can be given up to the granular material which has been cooled in the roasting process. This reduces the energy loss which would occur as a result of allowing the cooling of the granular material heated up in the cooling process and the heating up of the granular material cooled in the roasting process to occur separately from one another.

The process emissions may contain various chemical substances for which it is undesirable that they are discharged into the ambient air. It is possible to convert the undesirable substances into other substances which are not undesirable or less undesirable by incineration or post-incineration of said process emissions. It is therefore possible to prevent evil-smelling odours escaping into the environment of the production facility, which odours are produced, in particular, in the roasting and cooling of nuts and beans. The post-incineration can take place using post-incineration means known for the purpose.

By processing the process emissions in this way, it is possible, in addition, to convey the post-incinerated process emissions to the granular material which has been separated for reuse from the roasted food products and brought back to the beginning of the roasting process to give up its heat essentially to the granular material before escaping from the device. This achieves an appreciable energy saving.

Preferably, the process emissions from various process stages are conveyed to a common system of post-incineration means. This results in a limitation of the means needed and makes efficient insulation possible, so that an optimum energy saving is achieved.

The present invention also relates to the device for the carrying out of the method according to the invention.

Said device contains a section in which the roasting process takes place and/or a section in which the cooling process takes place and a section in which the post-incineration process takes place. The invention provides means with which emissions originating from the roasting process and/or the cooling process are post-incinerated.

In connection with the reuse of the granular material which is used in the roasting process, the section in which the roasting process takes place comprises means for roasting the raw food products and means for regenerating the granular material. Insofar as it is undesirable that the granular material remains mixed with the roasted food products, the section in which the roasting process takes place comprises means for separating the granular material from the food products.

In connection with the reuse of the granular material which is used in the cooling process, the section in which the cooling process takes place comprises means for cooling the roasted food products and means for regenerating the granular material. In this connection, the means for cooling the roasted food products may contain means for mixing the granular material and the roasted food products.

Insofar as it is undesirable that granular material remains mixed with the cooled food products, the section in which the cooling process takes place comprises means for separating the granular material from the cooled food products. In this connection, said separating means may be divided into means for a rough degree of separation and means for a fine degree of separation in order to improve the result of the separation.

The means for separating the granular material from the roasted or cooled food products may also be omitted. The separation then takes place integrally with the roasting process or the cooling process, respectively.

According to a further aspect of the invention, the section in which the post-incineration process takes place comprises means for the post-incineration of the emissions which are conveyed from at least one of the sections in which the roasting process or the cooling process, respectively, takes place. The process emissions can be post-incinerated from one or more of their sources to a greater or lesser degree.

The present invention also relates to the granular material which can be used in connection with or in the method and device according to the invention.

Preferably, the granular material is capable of absorbing heat from, or giving it up to, its environment in a reversible process. As a result, reuse of granular material can be achieved, which is advantageous for material saving. In addition, it is then possible to use the same granular material both in the roasting process and in the cooling process. For this purpose, it is unnecessary for the flows of granular material in both processes to be in communication with one another. As regards costs and interchangeability, it is, in particular, more efficient to use one type of granular material for both processes which are connected with one another than to use a separate type of granular material for each process.

Preferably, the granular material is a porous material. The granular material is then capable of absorbing, for example, water as coolant without the risk occurring of water being transferred to the cooled nuts and beans, which would adversely affect the product quality.

Various known substances can be taken as granular material. It appears that material which contains silicon and aluminium oxides is eminently suitable. The granular material may also contain metals, such as steel granules, and/or plastics.

Preferably, a microporous silicon oxide ($XSi_nO_m$, where X comprises one or more metals, for example Al, Bo, Mn, Ti), such as aluminium silicon oxide, aluminium phosphate which is incorporated in the oxide lattice, or zeolites with, for example, Bo or Ti incorporated are taken as granular material. These materials are mainly used as catalysts in synthesis processes and as microsieves for selective removal of certain molecules from, for example, mixtures of hydrocarbons.

The aluminium silicon oxides are characterized by a Si/Al ratio of 1 to infinity. The ends of this scale are formed by zeolite A (gismondine) with a Si/Al ratio of 1 and silica zeolites with a Si/Al ratio of (much) greater than 1. In the IUPAC mnemonic coding, the following, for example, belong to the class of the aluminium silicon oxides: LTA (Linde type A), $Na_{12}[Al_{12}Si_{12}O_{48}].27H_2O$, isotype SAPO-42; LTL (Linde type L), $K_6Na_3[Al_9Si_{27}O_{72}].21H_2O$, FAU (faujasite), $Na_{58}[Al_{58}Si_{134}O_{348}].24H_2O$, isotype SAPO-37; FER (ferrierite), $Na_2Mg_2[Al_6Si_{30}O_{72}].18H_2O$, isotypes ZSM-5, NU-23: $5 \leq Si/Al < 25$; MOR (mordenite), $Na_8[Al_8Si_{40}O_{96}].24H_2O$; and MFI (ZSM-5), $Na_n[Si_{96-n}Al_nO_{192}].16H_2O$ ($n \leq 8$), isotypes silicalite-1, boralite, TS-1, (Si, Ge)-MFI. In the IUPAC mnemonic coding, the following, for example, belong to the class of the aluminium phosphates which are incorporated in the oxide lattice (alpos): AFI ($AlPO_4$-5), $[Al_{12}P_{12}O_{48}].(C_3H_7)_4NOH.xH_2O$, isotypes SAPO-5, SSZ-24.

Modified zeolites can also be used as granular material. In this connection, the modification relates to the provision on or in the zeolite, for the purpose of improving the separating properties, of a metal core, a metal external shell or a mixture with metal powder, in particular, in such a way that the composition of metal and zeolite acquires ferromagnetic properties. As a result, the typical properties of the zeolites are retained, while separating procedures which make use of magnets can be used to remove the zeolites from the products.

As described above, metals can also be used as granular material. In this connection, ferromagnetic and ferrimagnetic materials are preferably used. The advantage of this is that separating procedures which make use of magnets can then be used to remove the granular material from the products. Examples of such ferromagnetic materials are steel alloys, nickel alloys (alnico) and ferroxdur (BaO-$6Fe_2O_3$). Examples of ferrimagnetic materials are ferrites ($XFe_2O_4$, in which X is a metal, such as, for example, Cu, Mg, Ni, Fe or Zn, trade name Ferroxcube), garnets ($3X_2O_3$-$5Fe_2O_4$, where X is a rare earth, such as, for example, Pr, Nd, Pm, Sa, Eu, Gd, Tb, Dy or Y, trade name Ferroxplana), silicon/iron compounds and nickel/iron compounds (Permalloy).

As described above, plastics can also be used as granular material. In this connection, a heat-resistant type of plastic, such as, for example, PVDF and PP (polypropylene), is preferably used. The advantage of this is that a high wear resistance and high chemical resistance are obtained. Examples of such plastics are teflon and plastics with "enclosed" electrostatic charges, as a result of which said plastics have advantageous properties in relation to the separation of the granular material and the products.

Preferably, silica zeolite is taken as granular material. The zeolites are heat-resistant, chemically inert, non-toxic and are used, inter alia, as fillers in animal feed.

Preferably, zeolite A, with which the best results are obtained according to tests carried out, is taken as granular material. Zeolite A contains $Na_{12}[Al_{12}Si_{12}O_{48}].27H_2O$. This material provides the following advantages for the roasting process. An appreciable amount of heat is released during the adsorption of water vapour which escapes from the product to be roasted during the roasting process, which intensifies the roasting process. As a porous material, it has a pore size which is such that only water can be adsorbed, as a result of which the granular material does not become "contaminated" by large-molecule compounds, as a result of which the granular material would not be, or would scarcely be, suitable for reuse. As a result of the water adsorption the hydrocarbons are released into an atmosphere which is low in water vapour, which is energetically favourable for the thermal post-incineration of these vapours. As a consequence of the release of the heat of adsorption, less than half of the mass of granular material otherwise needed is sufficient to cause the process to proceed within the boundary conditions set.

Zeolite A provides the following advantages for the cooling process. Like silica zeolite, zeolite A can absorb an appreciable amount of water, as a result of which the heat capacity proves to be two to three times as high as that of the dry granular material. As a result, a smaller mass of granular material is sufficient to carry out the cooling process within the conditions set for the purpose.

Because very small amounts of exhaust gas, compared with the current amounts of exhaust gas, are released both from the roasting process and from the cooling process as a result of the use of a zeolite, the vapour processing can be carried out by thermal post-incineration using a relatively small structural unit.

The steel spheres, silica zeolite and zeolite A mentioned as granular materials have mutually different properties. Unlike the steel granules, the zeolites have a porous structure, as a result of which they can adsorb water. Zeolite A can only adsorb water, during which process a high heat of adsorption is released, while silica zeolite can adsorb, in addition to a much larger amount of water than zeolite A, also all sorts of other substances because of its different pore sizes, in which process virtually no heat of adsorption is released. The differences in properties result in different performances. The choice of material for the granular material is therefore dependent on the various performances desired. An overview of the characterizing properties of the three materials mentioned is given in Table 1 and of the advantages and disadvantages in Table 2.

In the case of the method and device according to the invention, the starting point in each case is spherical granules having a diameter of between approximately 2 and 5 mm. It is not out of the question that the use of granules having larger or smaller diameters or granules having a shape other than spherical yield good or better results.

On the basis of the process conditions as regards temperatures, moisture contents and roasting and cooling speeds needed for a particular desirable product quality, the heat transfer between the three types of granular material mentioned and the nuts and beans to be roasted or to be cooled has been investigated. In this connection, model calculations have been carried out for an ideal situation with parameters such as the heat-transferring surface, the dwell time of the granular material in the process and the coefficients of heat transfer. The result of the calculations relates to the mass of granular material compared with the mass of the product, which ratio is necessary to meet the boundary conditions set. The mass ratios found are given in Table 3 for the roasting process and in Table 4 for the cooling process.

The possibility that granular material gets stuck in grooves or cavities in the products, referred to as inclusion, has been investigated by carrying out tests. In said tests, it has been found that coffee and cocoa beans and peanuts are sensitive to high mixing forces, with the result that product damage occurs and the risk of inclusion increases. In the case of coffee beans, a small degree of inclusion of the zeolite granules having a diameter of 3 mm has been observed. In the case of those granules having a diameter of 2.2 mm, no inclusion has been observed. The effect on the occurrence of inclusion in the case of granule diameters greater than 3 mm could not be investigated because said granules were not available. It is expected, however, that inclusion can be prevented by a good choice of granule size. In this connection, surface smoothness, particle mass, stickiness and the degree of product damage play a part.

To heat the granular material, it is advantageous if said material is polar because it can then also be heated in a simple way by means of a generally known microwave oven. In addition, the heating can then be accurately regulated in a simple way, which benefits the product control and, consequently, the product quality.

To separate the granular material from the roasted or cooled product, it is advantageous if said granular material has magnetic properties so that the separation can take place in a simple way by means of permanent magnets or electromagnets.

Several separating procedures have been investigated. Complete removal of the steel balls from the products can be achieved by means of magnetic separation. The product losses observed during the tests with a somersault magnet can be reduced to a fairly far-reaching extent by optimizing the procedure, a different way of separating with magnets and by various subsequent treatment steps. For zeolite granules, the vibrating screen gives a removal result of 99.99% in the case of coffee beans, 99.0% in the case of cocoa beans and 99.94% in the case of peanuts. The product loss in the case of coffee beans and peanuts is less than 0.1%. In the case of cocoa beans, various subsequent screening steps are necessary to limit the product loss because their particle size is situated in a wide range around the screen size employed in carrying out the tests and the granule size is variable. The speed of separation is dependent on the number of separating steps to be taken. This speed can be of the order of magnitude of seconds in the case of separation with magnets and the use of vibrating screens.

The invention will be illustrated in greater detail below by reference to the accompanying drawing, in which some exemplary embodiments are elaborated.

FIG. 2 shows, in diagrammatic form, the device according to the invention in another embodiment.

Figure 1:
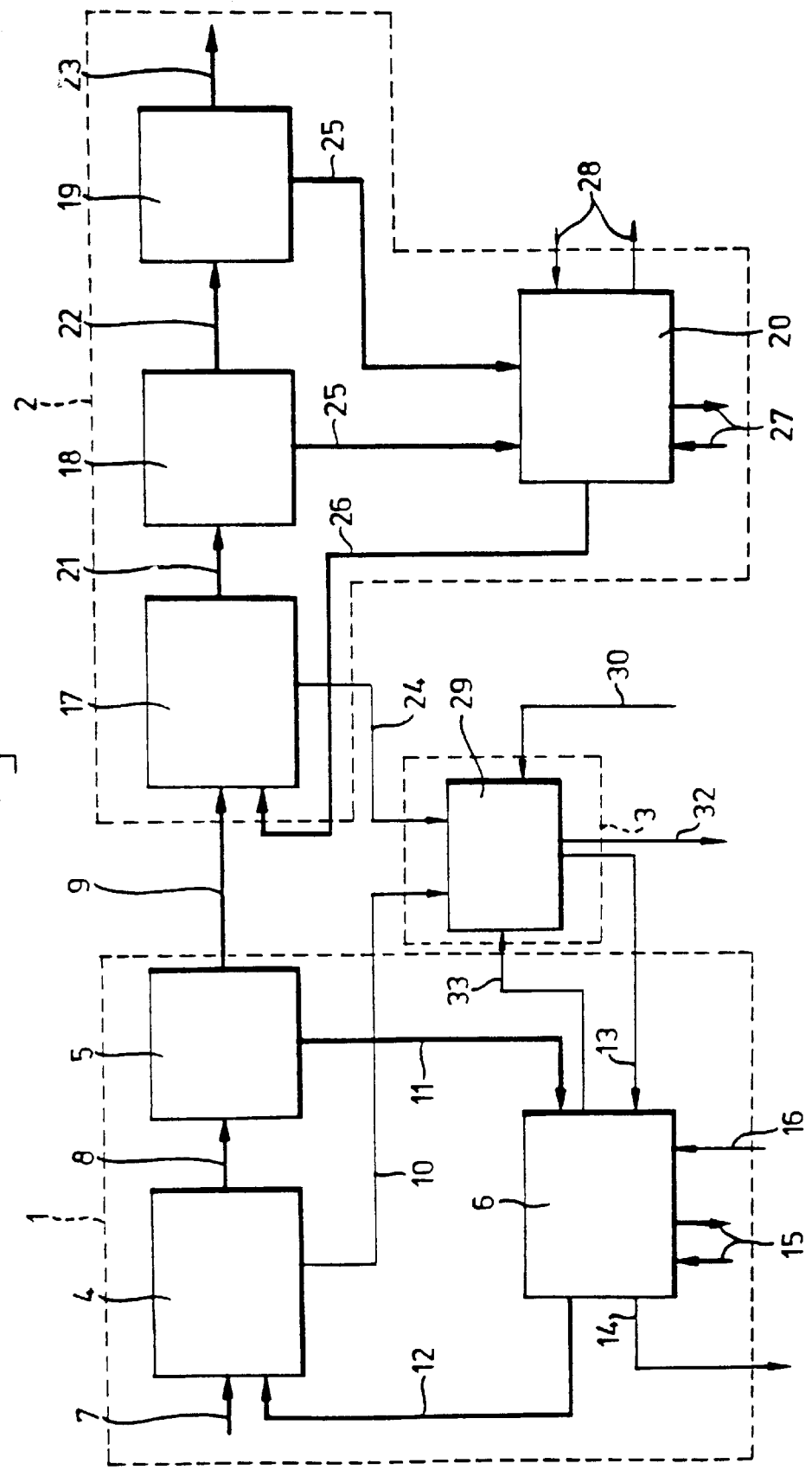
FIG. 1 shows, in diagrammatic form, the device according to the invention in one embodiment.

As is evident from FIG. 1, the device according to the invention comprises a section 1 in which the roasting process takes place, a section 2 in which the cooling process takes place and a section 3 in which the post-incineration process takes place.

The section 1, in which the roasting process takes place, comprises means 4 for roasting the raw food products, which means 4 may also optionally comprise means (not shown) for mixing the granular material and the food products, means 5 for separating the granular material from the food products and means 6 for regenerating the granular material.

In addition, said section 1 comprises lines 7 for conveying raw food products to the means 4 for roasting of said raw food products, lines 8 for conveying the roasted food products plus the granular material to the means 5 for separating said granular material and the roasted food products, lines 9 for discharging the roasted food products to the section 2 in which the cooling process takes place, lines 10 for discharging emissions to section 3, in which the post-incineration process takes place, lines 11 for conveying the granular material separated from the roasted food products to the means 6 for regenerating the granular material, lines 12 for conveying the regenerated granular material to the means 4 for roasting the raw food products fed in, lines 13 for conveying the emissions post-incinerated in section 3 to the means 6 for regenerating the granular material, lines 14 for removing the emissions post-incinerated in the section 3, which have previously been conveyed to the means 6 for regenerating the granular material, and lines 13 for conveying the emissions produced in the means 6 to means 29 for the post-incineration of said emissions. If desired, granular material can be let in or out of the section 1 via lines 15. Line 16 indicates that, for example, natural gas or electricity can be fed in, for example, for an incineration process or a microwave oven, respectively.

The section 2, in which the cooling process takes place, comprises means 17 for cooling the roasted food products, which means 17 may also optionally comprise means (not shown) for mixing the granular material and the roasted food products, means 18 for separating to a rough degree the granular material from the cooled food products, means 19 for separating to a fine degree the granular material from the cooled food products and means 20 for regenerating the granular material.

In addition, said section 2 comprises lines 9 for conveying the roasted food products to the means 17 for cooling said roasted food products, lines 21 for conveying the cooled food products plus the granular material to the means 18 for separating to a rough degree said granular material and the cooled food products, lines 22 for conveying the cooled food products plus the granular material to the means 19 for separating to a fine degree said granular material from the cooled food products, lines 23 for removing the finished food products for further processing outside the device according to the invention, lines 24 for discharging emissions to the section 3 in which the post-incineration process takes place, lines 25 for conveying the granular material separated from the cooled food products to the means 20 for regenerating the granular material and lines 26 for conveying the regenerated granular material to the means 17 for cooling the roasted food products fed in. If desired, granular material can be let in or out of the section 2 via lines 27. The lines 28 indicate that, for example, cooling water can be fed to the means 20 and removed from the latter for cooling the granular material.

The roasting and cooling of the raw or roasted food products, respectively may take place in batches or in a continuous flow. The means 4 and 17 for roasting or cooling, respectively, the food products may comprise, for example, a column containing a stirring mechanism or a drum. The means 5, 18 and 19 for separating the granular material from the food products may comprise, for example, vibrating screens or separating means based on permanent magnets or electromagnets or for electrostatic separation. All this is dependent on the type of granular material used.

The section 3 in which the post-incineration process takes place comprises means 29 for post-incinerating the emissions which are fed in from the sections 1 and 2 in which the roasting process or the cooling process, respectively, takes place. In addition, said section 3 comprises lines 10 for feeding in emissions from the section 1 in which the roasting process takes place, lines 24 for conveying emissions from the section 2 in which the cooling process takes place, lines 13 for discharging the post-incinerated emissions to the section 1 in which the roasting process takes place and lines 32 for discharging the post-incinerated emissions from the system. The line 30 indicates that, for example, natural gas can be fed to means 29 for the post-incineration process.

FIG. 2 shows an embodiment of the device according to the invention other than the one in FIG. 1. In the device according to FIG. 2, no separation of the granular material from the roasted food products takes place in the section 1, in which the roasting process takes place. In addition, FIG. 2 shows the situation in which means 19 are provided once for the separation of the granular material from the food products, in which no lines are present for conveying the emissions produced in means 6 to the means 29 for the post-incineration of said emissions, and in which no lines are present for discharging post-incinerated emissions from the system. A simpler device according to the invention is obtained with the embodiment according to FIG. 2.

The device according to FIG. 2 comprises lines 31 for conveying the granular material separated from the cooled food products to the means 6 in the section 1 for regenerating the granular material, after which it is used in the roasting process.

TABLE 1

| Molecular sieves | | Metal |
|---|---|---|
| Zeolite type A | Silica | Steel grinding balls |
| Na Si Al oxide (Si/Al = 1) | Si Al oxide (Si >> Al) | Carbon steel |
| Water adsorption only | Adsorption of water and other substances | No adsorption |
| Maximum water adsorption 210 g/kg | Moximum water adsorption 1 kg/kg | Not applicable |
| $H_{ads}$ = 4200 kJ/kg $H_2O$ | $H_{ads}$ = 0 kJ/kg | Not applicable |
| $C_p$ dry = 0.7 kJ/kgK | $C_p$ dry = 0.7 kJ/kgK | $C_p$ = 0.5 kJ/kgK |
| $C_p$ = wet = 1.4 kJ/kgK | $C_p$ wet = 2.4 kJ/kgK | |

TABLE 1-continued

| Molecular sieves | | Metal |
|---|---|---|
| Zeolite type A | Silica | Steel grinding balls |
| Bulk density '2 580 kg/m$^3$ | Bulk density = 430 kg/m$^3$ | Bulk density = 4990 kg/m$^3$ |
| $C_p$ dry = 406 kJ/m$^3$K | $C_p$ dry = 301 kJ/m$^3$K | $C_p$ = 2495 kJ/m$^3$K |
| $C_p$ wet = 812 kJ/m$^3$K | $C_p$ wet = 1032 kJ/m$^3$K | |

Dimensions: spheres 2–5 mm

TABLE 2

| Advantages and disadvantages per system component | Zeolite A | Silica | Steel |
|---|---|---|---|
| Advantages | | | |
| Roasting | Lowest mass compared with product mass Control by HF possible | Control by HF possible | Control by induction possible 100% removal from the product |
| Cooling | Retains water up to high temperature | Lowest mass compared with product mass | |
| Separation | | | No minimum temperature for desorption |
| Regeneration | Only water by adsorption, no contaminated exhaust gas on desorption | No minimum temperature for desorption | |
| | | | Wear resistance good |
| Various | Relatively cheap zeolite | | |
| Disadvantages | | | |
| Roasting | | | No stable mixture as a result of too high a mass compared with product mass |
| Cooling | | | No stable mixture as a result of too high a mass compared with product mass |
| Separation | No guarantee of 100% removal from product | No guarantee of 100% removal from product | |
| Regeneration | Desorption temperature of > 260° C. necessary | | |
| Various | Wear due to fracture | Wear due to fracture | Corrosion possible |

TABLE 3

| Product | T of incoming granular material (°C.) | stirred container, batch | | stirred bed of product, granular material continuous | | | |
|---|---|---|---|---|---|---|---|
| of (°C.) | | Zeolite A No Q ads. | Zeolite A Q ads. | Zeolite A No Q ads. | Zeolite A Q ads. | Silica | Steel |
| Coffee 20–220 | 400 | 5.0 | 2.5 | 3.1 | 1.9 | 3.1 | 5.8 |
| | 300 | 11.2 | 3.0 | 5.3 | 2.5 | 5.3 | 10.1 |
| Cocoa 85–135 | 250 | | | 3.0 | 0.6 | 3.2 | 5.0 |
| Peanuts 20–85 | 250 | | | 1.6 | — | 1.6 | 2.8 |
| | 180 | | | 2.4 | 0.45 | 2.5 | 4.6 |

TABLE 3-continued

| Product of (°C.) | T of incoming granular material (°C.) | stirred container, batch | | stirred bed of product, granular material continuous | | | |
|---|---|---|---|---|---|---|---|
| | | Zeolite A No Q ads. | Zeolite A Q ads. | Zeolite A No Q ads. | Zeolite A Q ads. | Silica | Steel |

Calculation results of mass ratio for granular material and product
Zeolite A2 = 2.36 m
Silica 2.2 m
Steel 2.2 mm

TABLE 4

| | T incoming | stirred bed of product, granular material continuous | | |
|---|---|---|---|---|
| Product dT (°C.) | granules (°C.) | Zeolite A | Silica | Steel |
| Coffee | | | | |
| 220–30 | 15 | 3.4 | 2.2 | 10.1 |
| 100–30 | 15 | 2.2 | 1.3 | 6.5 |
| Cocoa | | | | |
| 135–70 | 15 | 1.3 | 0.7 | 3.8 |
| Peanuts | | | | |
| 85–30 | 15 | 2.7 | 1.8 | 9.0 |

Calculation results of mass ratio for granular material and product
Zeolite A2 = 2.36 mm
Silica 2.2 mm
Steel 2.2 mm

We claim:

1. Method of heating and cooling raw food products comprising:
   a) heating a raw food product by contacting the food product with heated, non-food, granular material;
   b) cooling the heated food product; and
   c) separating the food product from the granular material wherein the heating or cooling of the food product during step a), or step b) respectively, is effected by contacting the food product with a heat transfer material comprising porous granular zeolite, the granular zeolite being at a different temperature from the temperature of the food product.

2. A method according to claim 1 wherein the heated granules comprise the granular zeolite, the different temperature being a higher temperature.

3. A method according to claim 1 wherein step b) is effected by contacting the heated food product with cooled granular material.

4. A method according to claim 3 wherein the cooled granules comprise the granular zeolite.

5. A method according to claim 1 wherein heating step a) is conducted to sterilize, pasteurize, dry or roast the food product.

6. A method according to claim 5 wherein the food product comprises nuts, beans, whole peanuts, crushed peanuts, coffee beans or cocoa beans.

7. A method according to claim 1 wherein the zeolite comprises zeolite A.

8. A method according to claim 1 wherein the zeolite comprises aluminum phosphate incorporated in the zeolite lattice.

9. A method according to claim 1 wherein the granular material comprises zeolite and has magnetic properties to facilitate separation of the granular material from the food product.

10. A method according to claim 9 wherein the ferromagnetic granular zeolite material comprises zeolite granules having a metal core, a metal external shell or a metal powder component, the metal being ferromagnetic or ferrimagnetic to provide the ferromagnetic properties.

11. A method according to claim 1 wherein the granular material comprises a polar material and is suitable for heating in a microwave oven.

12. A method according to claim 1 wherein the granular material is reused for cooling the food products.

13. A method according to claim 1 wherein the granular material is partially separated from the heated food product, and the separated granular material is subsequently used in cooling the heated food product in step b).

14. A method according to claim 13 wherein granular material heated from use in cooling step b) is conveyed to granular material cooled from use in heating step a).

15. A method according to claim 1 wherein heating step a) generates process emission vapors and at least some of the process emission vapors are collected and thermally processed by a post-incineration unit.

16. A method according to claim 15 wherein the granular material is recycled from step c) to step a) and heat generated by the post-incineration unit is transferred to the granular material separated in step c).

17. A method according to claim 15 wherein process emissions from multiple process stages are conveyed to a common post-incineration unit.

18. A method of sterilizing, pasteurizing, drying or roasting a food product selected from the group consisting of nuts, beans, whole peanuts, crushed peanuts, coffee beans and cocoa beans the method comprising:
   a) heating a food product by contacting the food product with warmer granular material;
   b) cooling the heated food product by contacting the food product with cooler granular material; and
   c) separating the granular material from the cooled food product;
wherein the granular material in both steps a) and b) comprises a zeolite having a pore size such that water vapour is adsorbed in preference to large-molecule compounds and wherein the zeolite releases heat upon adsorption of water vapour.

19. A method according to claim 18 wherein the zeolite comprises spherical granules of zeolite A having a particle size of from approximately 2 to approximately 5 mm.

20. Method of heating and cooling raw food products that release water vapor on heating, the method comprising:
   a) heating the raw food product by contacting the food product with heated, non-food, granular material;
   b) cooling the heated food product; and
   c) separating the food product from the granular material wherein the heating or cooling of the food product during step a), or step b) respectively, is effected by contacting the food product with a granular heat transfer material having a pore size such as to preferentially adsorb water vapor wherein the granular heat transfer material releases heat during the adsorption of water vapour.

21. A method according to claim 1 wherein the granular material comprises a material selected from the group consisting of plastic, polytetrafluoroethylene and polypropylene.

* * * * *

UNITED STATES PATENT AND TRADEMARK OFFICE
CERTIFICATE OF CORRECTION

PATENT NO.     : 6,000,144
DATED          : December 14, 1999
INVENTOR(S)    : Paulus, Josephus, Theodorus & Bussmann, et. al.

It is certified that error appears in the above-identified patent and that said Letters Patent is hereby corrected as shown below:

Title page, item [73] Assignee: should read – Nederlandse Organisatie voor Toegepast-Natuurweten-Schappelijk Onderzoek (TNO).

Signed and Sealed this

Eighteenth Day of July, 2000

Attest:

Q. TODD DICKINSON

*Attesting Officer*          *Director of Patents and Trademarks*